(12) United States Patent
Tonkin et al.

(10) Patent No.: US 10,344,717 B2
(45) Date of Patent: Jul. 9, 2019

(54) INTAKE AIR HEATER ASSEMBLY HAVING INSULATED BUSHING

(71) Applicant: Phillips & Temro Industries Inc., Eden Prairie, MN (US)

(72) Inventors: Steven W. Tonkin, Eden Prairie, MN (US); Reginald M. McKeever, Minneapolis, MN (US)

(73) Assignee: Phillips & Temro Industries Inc., Eden Prairie, MN (US)

( * ) Notice: Subject to any disclaimer, the term of this patent is extended or adjusted under 35 U.S.C. 154(b) by 46 days.

(21) Appl. No.: 15/663,910

(22) Filed: Jul. 31, 2017

(65) Prior Publication Data
US 2019/0032608 A1 Jan. 31, 2019

(51) Int. Cl.
*F02M 31/13* (2006.01)
*H05B 3/04* (2006.01)
*H05B 1/02* (2006.01)
*H05B 3/03* (2006.01)

(52) U.S. Cl.
CPC ........... *F02M 31/13* (2013.01); *H05B 1/0236* (2013.01); *H05B 3/03* (2013.01); *H05B 3/04* (2013.01)

(58) Field of Classification Search
CPC ........ F02M 31/13; F02M 31/02; F02M 31/04; H05B 1/0236; H05B 3/04
See application file for complete search history.

(56) References Cited

U.S. PATENT DOCUMENTS

| | | | | |
|---|---|---|---|---|
| RE32,064 E | * | 1/1986 | Nielsen | B01D 1/20 159/4.2 |
| 5,595,164 A | * | 1/1997 | Thimmesch | F02M 31/13 123/549 |
| 6,372,346 B1 | * | 4/2002 | Toth | B22F 1/025 428/403 |
| 2007/0193562 A1 | * | 8/2007 | Betcher | F02M 31/13 123/543 |
| 2017/0133180 A1 | * | 5/2017 | Sotnikov | H01H 31/30 |

OTHER PUBLICATIONS

Kharanzhevskiy et al., Short-Pulse Laser Sintering of Multilayer Hard Metal Coatings: Structure and Wear Behavior, Jun. 2015, Udmurt State University, "Lasers in Manufacturing and Materials Processing", Jun. 2015, vol. 2, Issue 2, pp. 91-102 https://link.springer.com/article/10.1007/s40516-015-0008-1.*

\* cited by examiner

*Primary Examiner* — Jacob M Amick
(74) *Attorney, Agent, or Firm* — Harness, Dickey & Pierce, P.L.C.

(57) ABSTRACT

In one or more implementations, an example air heater assembly is described. The air heater assembly includes a frame defining an aperture and an air heater that includes at least one heating element. The frame is configured to receive the air heater. The air heater assembly includes a terminal configured to connect with the at least one heating element. The air heater assembly includes a hard coated bushing configured to receive the terminal, and the hard coated bushing is configured to be received within the aperture to form a seal and to electrically isolate the terminal from the frame.

12 Claims, 8 Drawing Sheets

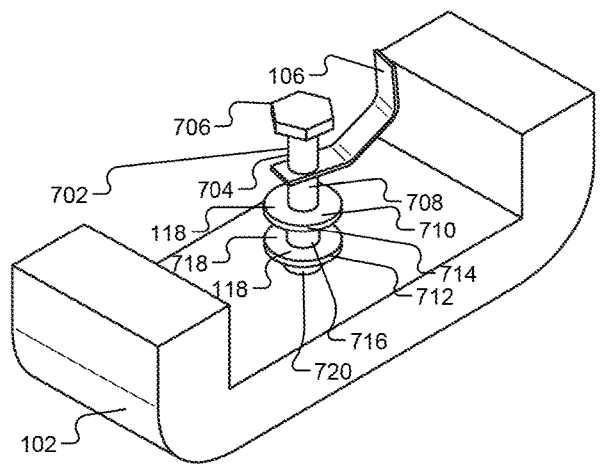
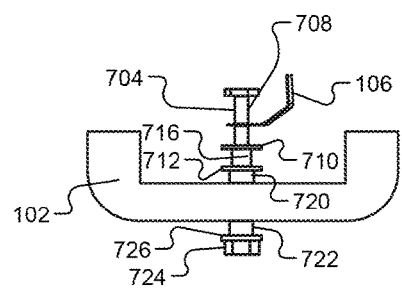
FIG. 7A
FIG. 7B
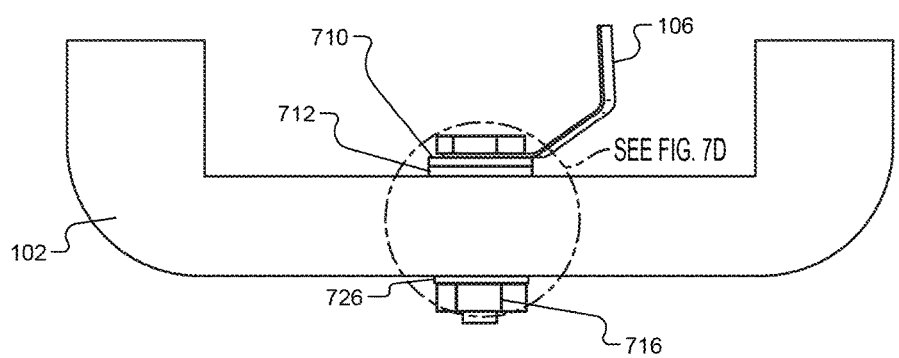
FIG. 7C
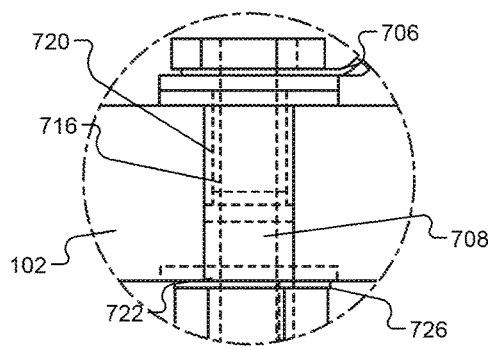
FIG. 7D

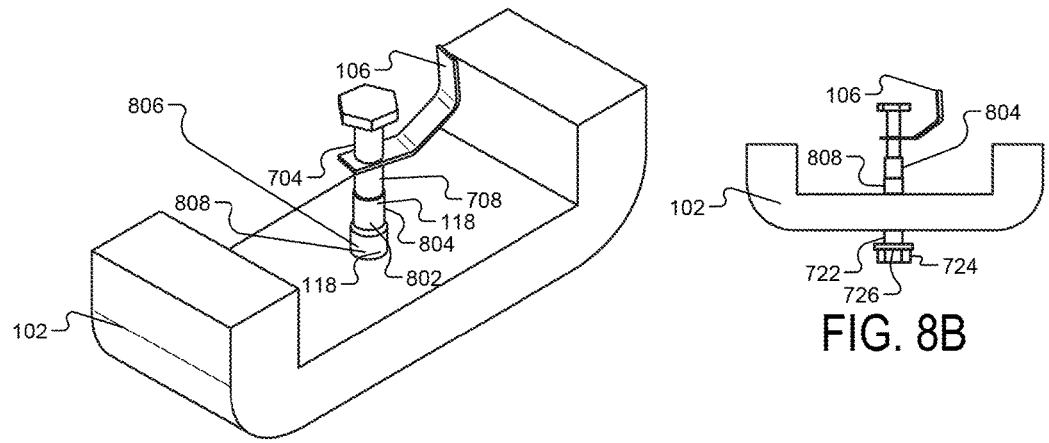
FIG. 8A
FIG. 8B
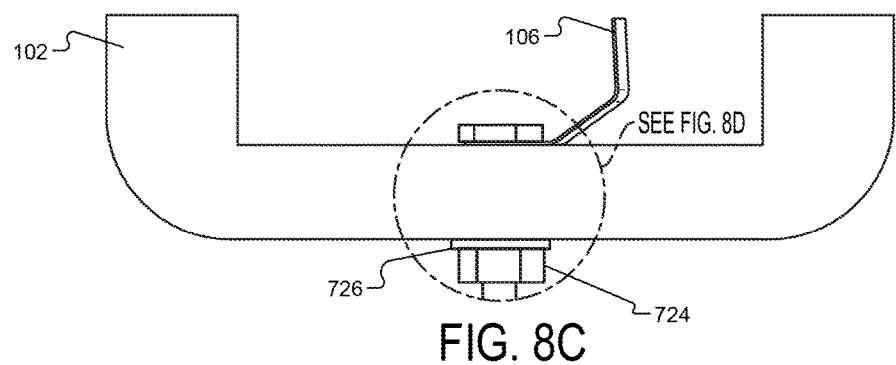
FIG. 8C
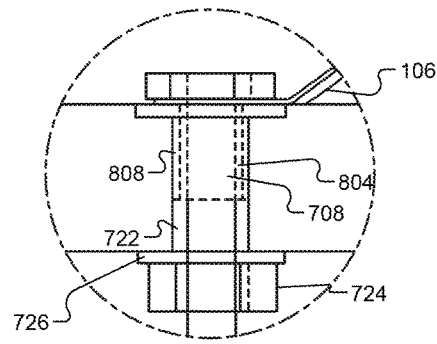
FIG. 8D

INTAKE AIR HEATER ASSEMBLY HAVING INSULATED BUSHING

FIELD

The present disclosure relates to intake air heating systems in internal combustion engines and more particularly to an intake air heating system that employs one or more hard coated bushings.

BACKGROUND

An air-fuel mixture for an internal combustion engine is harder to ignite when cold, leading to less complete combustion and increased emissions. Once the engine has warmed up, the cylinders may warm the air-fuel mixture sufficiently. However, at startup, the engine may have no heat to contribute to the air-fuel mixture. Cold start conditions are especially severe when the ambient air temperature is low. An intake air heating system may be used to heat air arriving at the engine. This system may be located within or prior to the intake manifold. The intake air heating system may be brought up to temperature prior to attempting to start the engine.

Heating the intake air may allow for easier ignition and may hold the fuel in suspension more effectively, leading to fewer fuel droplets falling out of suspension in the air. Intake air heating systems may allow for faster starts of the engine, may reduce startup emissions, reduce engine wear, reduce overall battery consumption during startup, and reduce startup fuel consumption.

Electrical air heater assemblies are typically housed within metallic frames (i.e., enclosures, housings, etc.). These frames include resistive metallic heating elements that emit heat based upon the current flowing through the heating elements. The current path from the outside of the frame through the heating element is electrically insulated from the frame to prevent short circuits. Typically, bushings are employed to insulate a current path from the frame. Additionally, the bushings serve to seal apertures within the frame to prevent vacuum leaks. As such, these bushings are typically in contact with the electrical connection providing the current to the heating elements and the frame. However, these bushings are manufactured from plastic or silicone. Due to the relatively high temperatures generated by the heating elements, the heat can destroy the bushings.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one or more implementations, an example air heater assembly is described. The air heater assembly includes a frame defining an aperture and an air heater that includes at least one heating element. The frame is configured to receive the air heater. The air heater assembly includes a terminal configured to connect with the at least one heating element. The air heater assembly includes a hard coated bushing configured to receive the terminal, and the hard coated bushing is configured to be received within the aperture to form a seal and to electrically isolate the terminal from the frame.

In an example, the hard coated bushing includes an aluminum oxide layer. In an example, a thickness of the aluminum oxide layer ranges from 0.0005" to 0.002". In an example, the hard coated bushing includes a rectangular hard coated bushing having rounded edges. In an example, the hard coated bushing includes a Type III hard coat anodized bushing.

In an example, the hard coated bushing comprises a tapered cylindrical hard coated bushing. In an example, the tapered cylindrical hard coated bushing is configured to receive a mechanical fastener. The tapered cylindrical hard coated bushing forms a collar about the mechanical fastener, and the mechanical fastener includes the terminal.

In an example, the air heater assembly includes a first hard coated bushing and a second hard coated bushing. The first hard coated bushing includes an elongated barrel portion and the second hard coated bushing includes an elongated barrel portion. The elongated barrel portion of the second hard coated bushing is configured to receive the first hard coated bushing, and the elongated barrel portion of the first hard coated bushing is configured to receive the terminal.

In an example, the elongated barrel portion of the first hard coated bushing is connected to an annular ring portion, and the elongated barrel portion of the second hard coated bushing is connected to an annular ring portion.

In one or more implementations, an example air heater assembly is described. The air heater assembly includes a frame defining an aperture and an air heater including at least one heating element. The frame is configured to receive the at least one air heater. The air heater assembly includes one or more holder assemblies that are configured to receive the at least one heating element. The air heater assembly includes a terminal configured to connect with the at least one heating element and a hard coated bushing configured to receive the terminal. The coated bushing is configured to be received within the aperture to form a seal and to electrically isolate the terminal from the frame.

In an example, the hard coated bushing comprises an aluminum oxide layer. In an example, a thickness of the aluminum oxide layer ranges from 0.0005" to 0.002". In an example, the hard coated bushing includes a rectangular hard coated bushing having rounded edges. In an example, the hard coated bushing comprises a Type III hard coat anodized bushing.

In an example, the hard coated bushing includes a tapered cylindrical hard coated bushing. In an example, the tapered cylindrical hard coated bushing is configured to receive a mechanical fastener. The tapered cylindrical hard coated bushing forms a collar about the mechanical fastener, and the mechanical fastener includes the terminal.

In an example, the air heater assembly includes a first hard coated bushing and a second hard coated bushing. The first hard coated bushing includes an elongated barrel portion, and the second hard coated bushing includes an elongated barrel portion. The elongated barrel portion of the second hard coated bushing is configured to receive the first hard coated bushing, and the elongated barrel portion of the first hard coated bushing configured to receive the terminal.

In an example, the elongated barrel portion of the first hard coated bushing is connected to an annular ring portion, and the elongated barrel portion of the second hard coated bushing is connected to an annular ring portion. In an example, the holder assemblies include ceramic holder assemblies.

In one or more implementations, an example air heater assembly is described. The air heater assembly includes a frame defining an aperture and an air heater including at least one heating element. The frame is configured to receive the air heater. The air heater assembly includes a terminal configured to connect with the at least one heating element. The air heater assembly includes a first hard coated bushing including an elongated barrel portion configured to receive the terminal and a second hard coated bushing including an elongated barrel portion configured to receive the first hard coated bushing. The first hard coated bushing and the second hard coated bushing are configured to be received within the aperture to form a seal and to electrically isolate the terminal from the frame.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7A is an isometric view of a first hard coated bushing and a second hard coated bushing employed by the intake air heating system according to the principles of the present disclosure;

FIG. 7B is a side view of the first hard coated bushing and the second hard coated shown in FIG. 7A according to the principles of the present disclosure;

FIG. 7C is another side view of the first hard coated bushing and the second hard coated shown in FIGS. 7A and 7B according to the principles of the present disclosure;

FIG. 7D is a partial cross-sectional view of the first hard coated bushing and the second hard coated shown in FIG. 7C according to the principles of the present disclosure;

FIG. 8A is an isometric view of a first hard coated bushing and a second hard coated bushing employed by the intake air heating system according to the principles of the present disclosure;

FIG. 8B is a side view of the first hard coated bushing and the second hard coated shown in FIG. 7A according to the principles of the present disclosure;

FIG. 8C is another side view of the first hard coated bushing and the second hard coated shown in FIGS. 7A and 7B according to the principles of the present disclosure; and FIG. 8D is a partial cross-sectional view of the first hard coated bushing and the second hard coated shown in FIG. 7C according to the principles of the present disclosure.

In the drawings, reference numbers may be reused to identify similar and/or identical elements.

DETAILED DESCRIPTION

The present disclosure is directed to hard coated bushings. In various implementations, metal bushings, such as aluminum bushings, include an insulating layer that mitigates current flow between the electrical connection and the frame. For example, air heaters can employ hard coated aluminum bushings to seal the apertures while preventing current from flowing from the electrical connection to the fame. These hard coated bushings can also function as a heat sink to mitigate damage to other components of the air heater.

In one or more implementations, hard coated bushings may include bushings subjected to a Type III hard coat anodizing process. For instance, one or more aluminum bushings can be subjected to a suitable electrochemical process. The electrochemical process can include subjecting aluminum bushings to a sulfuric acid bath that contains anywhere from about one hundred and eighty (180) to about two hundred (200) grams per Liter of sulfuric acid. An operating temperature may range between about twenty-eight degrees Fahrenheit (28° F.) to about thirty-two degrees Fahrenheit (32° F.). A current having a current density ranging from about twenty-four (24) Amps per square foot to about forty (40) Amps per square foot is applied to bath and/or the bushings within the bath. The current is applied for an amount of time corresponding to the desired oxide thickness.

Figure 1:
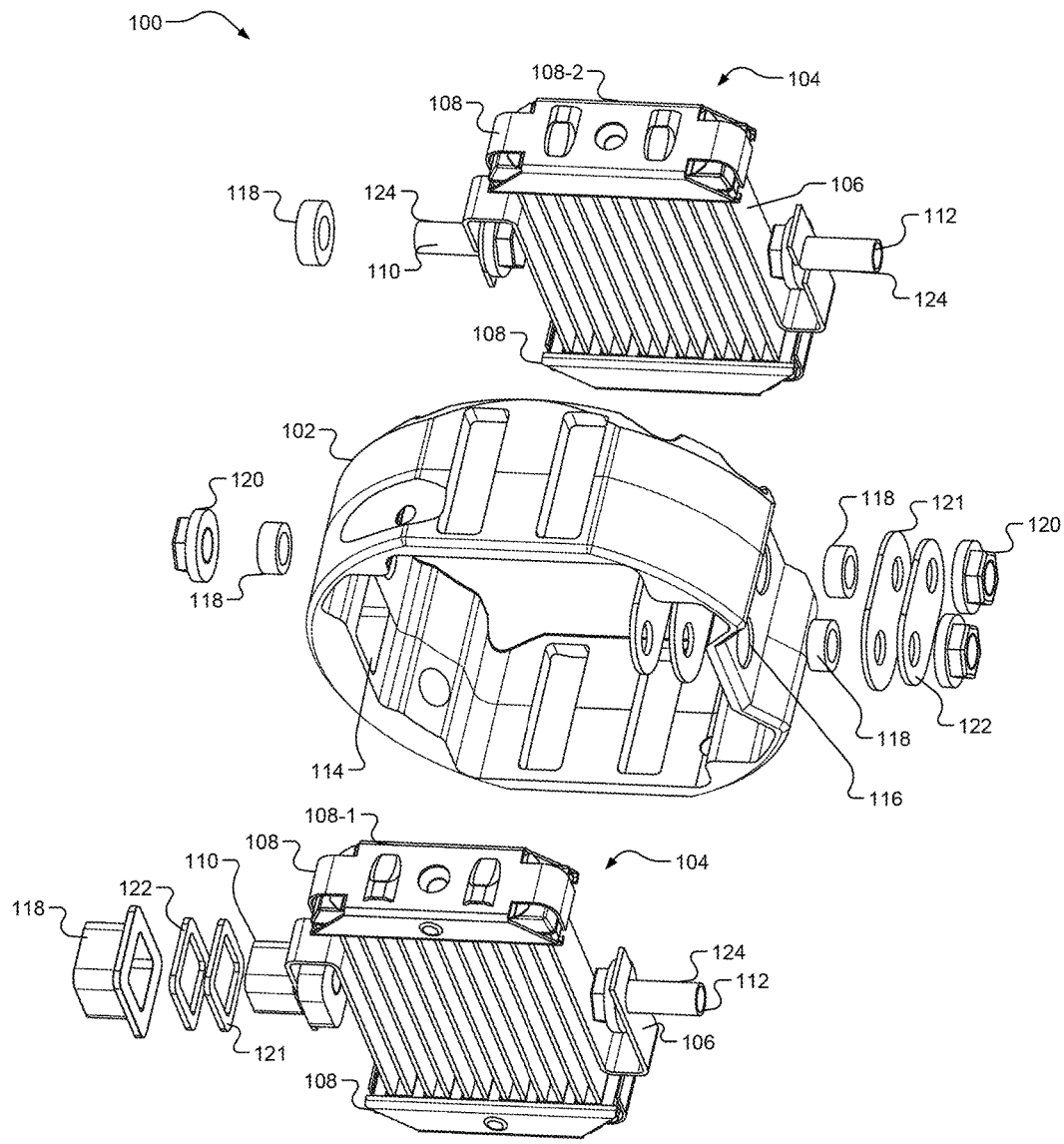
FIG. 1 is an exploded view of an example intake air heating system for a vehicle according to the principles of the present disclosure.

FIG. 1 illustrates an example air intake assembly 100 configured to mount to a head of an internal combustion engine. An intake tube is typically mounted to a side of the air intake assembly 100 opposite the head. The air intake assembly 100 can be positioned between the intake tube and the head of the engine.

The air intake assembly 100 includes a frame 102 that is configured to receive one or more air heaters 104 therein. In one or more implementations, the frame 102 includes an aluminum frame, or the like. The air heaters 104 include one or more heating elements 106. The heating elements 106 include electrically conductive material having a predetermined resistivity and are shaped to provide the desired total resistance in the length and space available. Accordingly, the heating elements 106 may include a multitude of cross-sectional configurations. In some examples, the heating elements 106 may be a suitable resistive material, such as a stainless steel material, a nichrome material, an iron-chromium-aluminum material, and the like, that generates heat when a voltage is applied to the air heater 104 due to current flowing through the heating elements 106. As shown, the heating elements 106 may be constructed in a serpentine configuration as shown in FIG. 1.

While FIG. 1 illustrates two air heaters 104 (i.e., 104-1, 104-2), it is understood that other configurations are possible without departing from the scope of the present disclosure. For example, a single air heater 104 can be employed. Additionally, three or more air heaters 104 can be employed.

The heating elements 106 are received within respective holder assemblies 108. As shown, a first holder assembly 108-1 receives an end portion (i.e., a top portion) of the heating elements 106, and a second holder assembly 108-2 receives another end portion (i.e., a bottom portion) of the heating elements 106. The holder assemblies 108 may include suitable ceramic materials, or the like. For example, the holder assemblies 108 may also provide insulation properties. Additionally, the holder assemblies 108 assist in securing the air heaters 104 in position. For example, the holder assemblies 108 may serve to prevent excessive movement caused by vibration. The frame 102 receives the holder assemblies 108 to support the holder assemblies 108 and the heating elements 106. The holder assemblies and/or the heating elements 106 can be secured within the frame 102 using suitable fasteners.

The air heater 104 includes terminals 110, 112 to electrically connect the air heaters 104 to a battery. The terminals 110, 112 interface with the heating elements 106 to provide an electrical path from the battery to the heating elements 106. The terminals 110, 112 are received within corresponding apertures 114, 116 defined within the frame 102. In some implementations, the terminals 110, 112 include mechanical fasteners, such as bolts or the like.

As described herein, the air heater assembly 100 employs bushings 118 to electrically isolate the terminals 110, 112 and/or other electrical interconnections between the heating elements 106 and the frame 102. The air heater assembly 100 also includes one or more nuts 120, insulating bars 121, and/or jumper bars 122 to secure the various components together. The nuts 120 are received by corresponding mechanical fasteners 124, which are described herein in greater detail.

FIGS. 2A through 7D illustrate various implementations of hard coated bushings 118 that can be employed by the air intake assembly 100. In an example implementation, the hard coated bushings 118 are used to seal the apertures 114, 116 and provide heat conduction generated by the terminals 110, 112. Additionally, the hard coated bushings 118 provide an electrical insulator to prevent a current short between the heating element 106 and/or terminal 110, 112 and the frame 102. The hard coated bushings 118 are configured to receive a corresponding electrical terminal 110, 112, and the hard coated bushings 118 are configured to be received by the corresponding apertures 114, 116 defined within the frame 102.

In one example, the hard coated bushings 118 include an aluminum bushing that has been subjected to an aluminum hard coating anodizing process. For instance, aluminum bushings may be entirely submerged within a sulfuric acid bath at a temperature ranging from approximately thirty degrees (30) Fahrenheit to thirty-five (35) degrees Fahrenheit with a density ranging from twenty (20) amps to forty amps (40) for a predetermined time period. The predetermined time period may be any time period to sufficiently create a sufficient layer of aluminum oxide over the surface of the hard coated bushings. In some examples, the thickness of the aluminum oxide ranges from about 0.0005" to about 0.002".

Figure 2A:
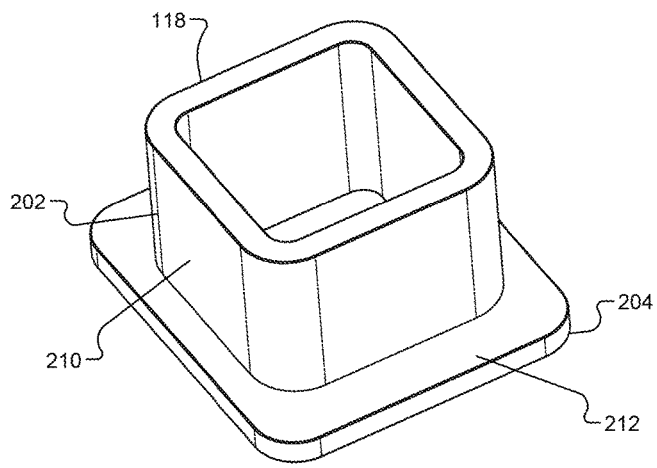
FIG. 2A is an isometric view of a hard coated bushing employed by the intake air heating system according to the principles of the present disclosure.
Figure 2B:
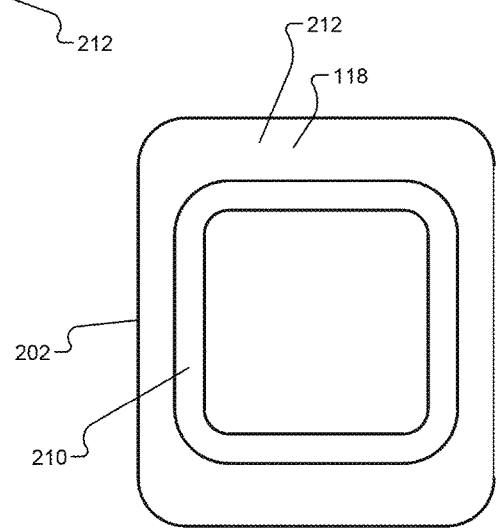
FIG. 2B is a plan view of the hard coated bushing shown in FIG. 2A according to the principles of the present disclosure.
Figure 2C:
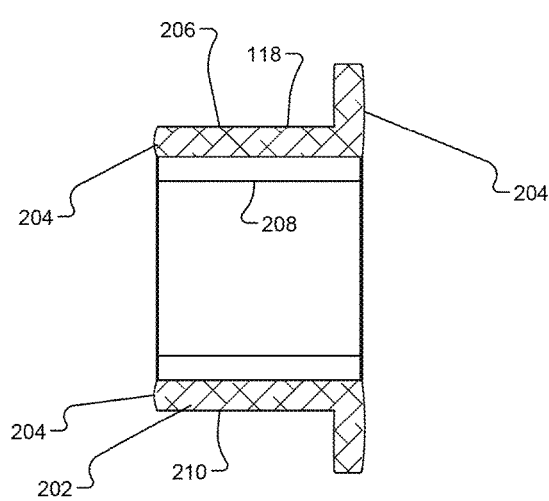
FIG. 2C is a cross-sectional view of the hard coated bushing shown in FIG. 2B according to the principles of the present disclosure.

FIGS. 2A through 2C illustrate an example implementation of the hard coated bushings 118 in accordance with an example implementation of the present disclosure. In this implementation, the hard coated bushings 118 include generally rectangular hard coated bushings 202. As shown, the rectangular hard coated bushing 202 include rounded edges 204 to reduce pressure exerted on the respective edges. It is understood that rounded may include beveled surfaces, chamfered surfaces, curved surfaces, smooth surfaces, or the like. Thus, wear caused to the rectangular hard coated bushing 202 may be mitigated. It is understood that one or more of the edges of the hard coated bushings 118 described herein may be rounded to reduce pressure exerted on the respective edges.

The interior surfaces 206 and the exterior surfaces 208 of the rectangular hard coated bushing 202 include the aluminum oxide layer. As such, the rectangular hard coated bushing 202 mitigates current shorts between the terminals 110, 112 and the frame 102. For example, for a potential current short to occur, both the interior surface 206 and the exterior surface 208 would have portions that do not include an aluminum oxide layer (i.e., both the interior surface 206 and the exterior surface 208 include exposed aluminum portions). Additionally, the rectangular hard coated bushing 202 includes an elongated portion 210 that is received in the corresponding aperture and a flanged portion 212 that abuts with the frame 102.

Figure 3A:
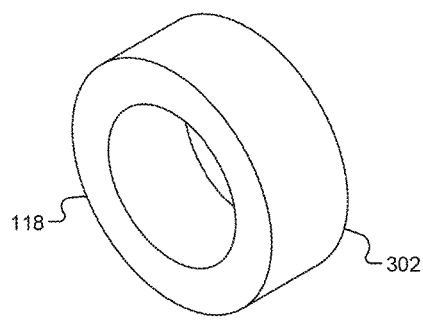
FIG. 3A is an isometric view of a hard coated bushing employed by the intake air heating system according to the principles of the present disclosure.
Figure 3B:
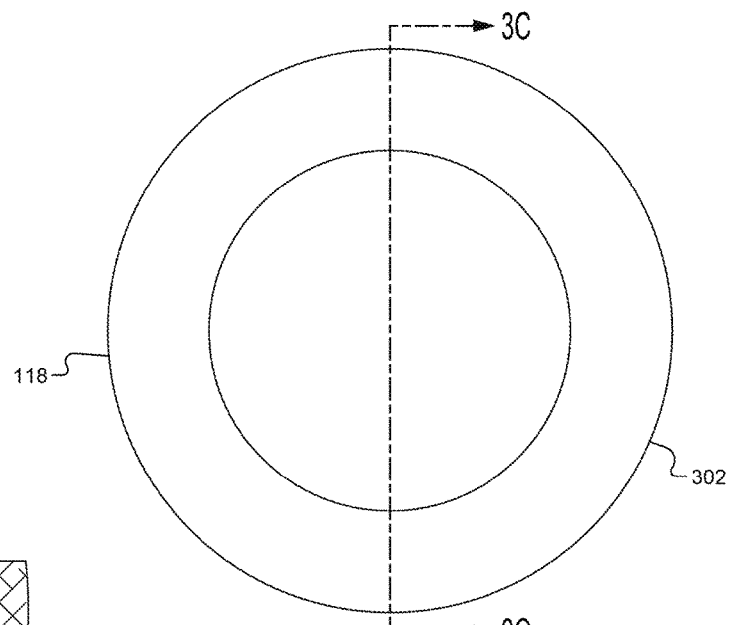
FIG. 3B is a plan view of the hard coated bushing shown in FIG. 3A according to the principles of the present disclosure.
Figure 3C:
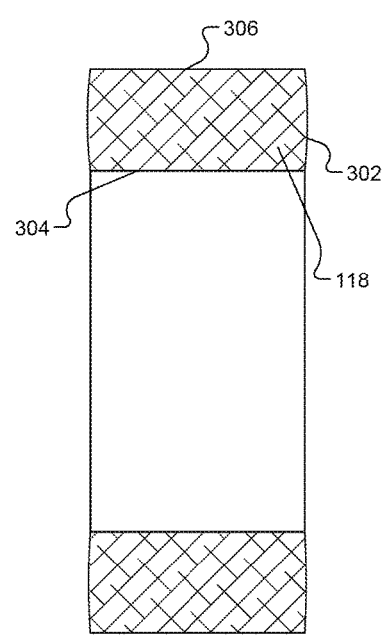
FIG. 3C is a cross-sectional view of the hard coated bushing shown in FIG. 3B according to the principles of the present disclosure.

FIGS. 3A through 3C illustrate another implementation of the hard coated bushings 118 in accordance with the present disclosure. In this implementation, the hard coated bushings 118 include a generally cylindrical hard coated bushing 302. Similar to the rectangular hard coated bushing 202, the cylindrical hard coated bushing 302 includes an interior surface 304 and an exterior surface 306. The interior surface 304 and the exterior surface 306 include the aluminum oxide layer to mitigate current shorts between the terminals 110, 112 and the frame 102.

Figure 4A:
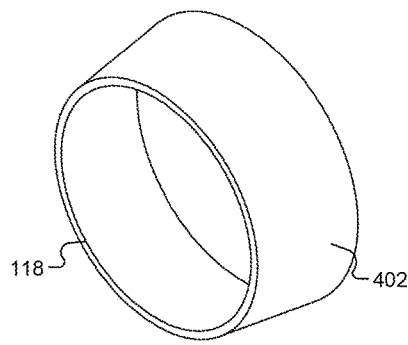
FIG. 4A is an isometric view of a hard coated bushing employed by the intake air heating system according to the principles of the present disclosure.
Figure 4B:
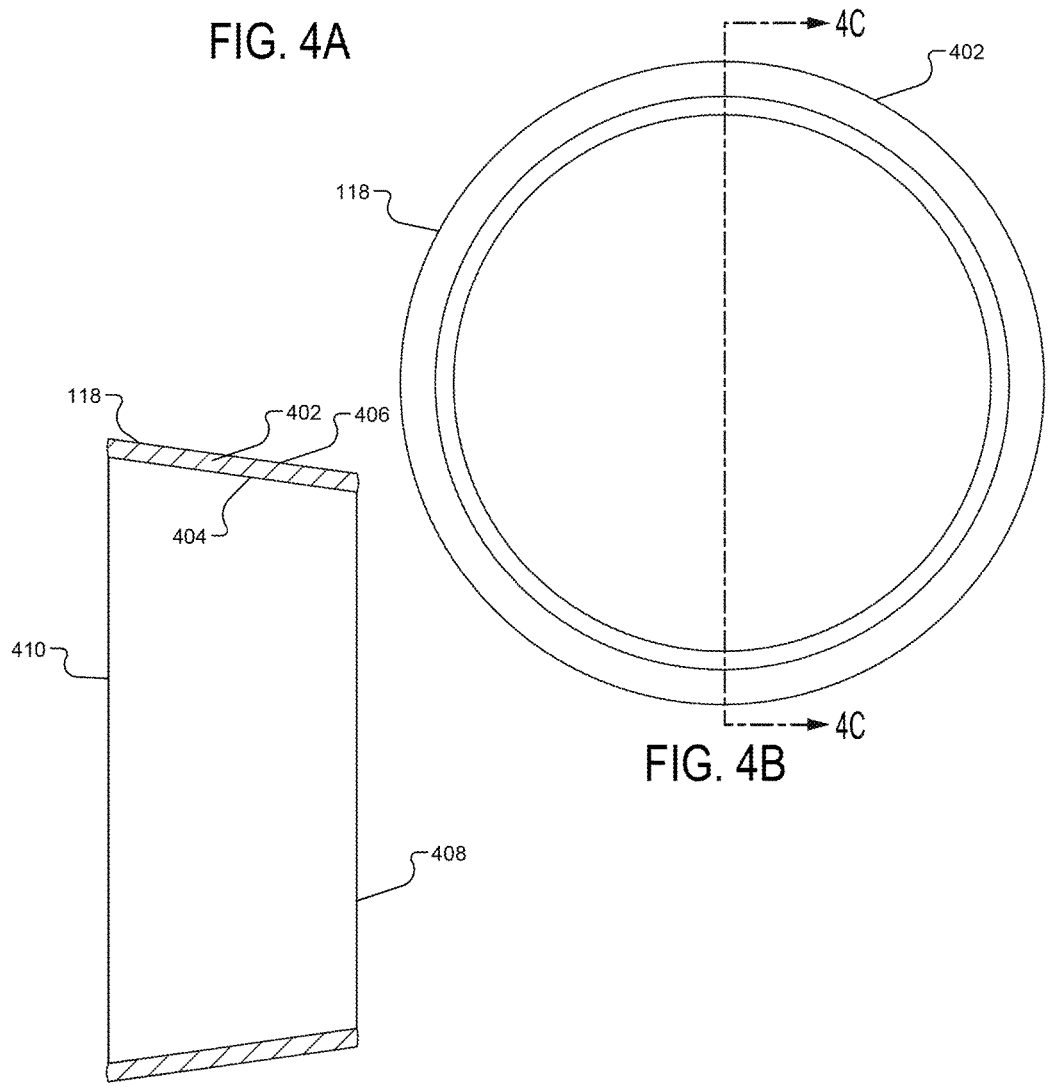
FIG. 4B is a plan view of the hard coated bushing shown in FIG. 4A according to the principles of the present disclosure.
Figure 4C:
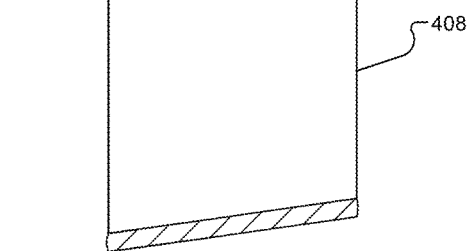
FIG. 4C is a cross-sectional view of the hard coated bushing shown in FIG. 4B according to the principles of the present disclosure.

FIGS. 4A through 4C illustrate another implementation of the hard coated bushings 118 in accordance with the present disclosure. In this implementation, the hard coated bushings 118 include a generally tapered cylindrical hard coated bushing 402. Similar to the rectangular hard coated bushing 202 and the cylindrical hard coated bushing 302, the tapered cylindrical hard coated bushing 402 includes an interior surface 404 and an exterior surface 406. The interior surface 404 and the exterior surface 406 include the aluminum oxide layer to mitigate current shorts between the terminals 110, 112 and the frame 102. As shown, the tapered cylindrical hard coated bushing 402 includes a first end 408 having a first diameter and a second end 410 having a second diameter, and the second diameter is larger than the first diameter.

Figure 5:
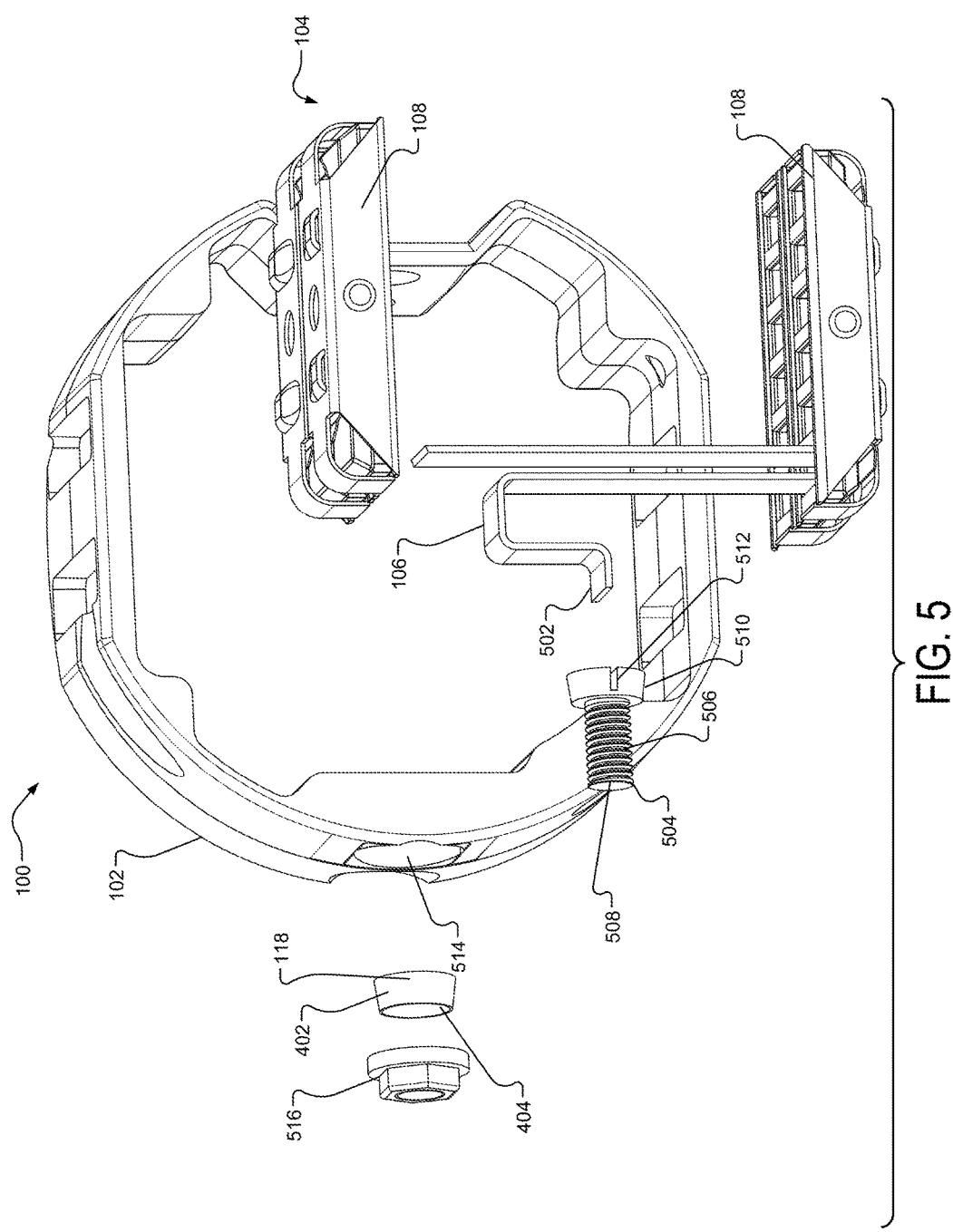
FIG. 5 is an exploded view of an example intake air heating system for a vehicle employing the hard coated bushing shown in FIGS. 4A through 4C according to the principles of the present disclosure.

FIG. 5 illustrates an example air intake assembly 100 employing the tapered cylindrical hard coated bushing 402. As shown, the heating element 106 includes an end 502 that is configured to be received by a mechanical fastener 504. In an example implementation, the mechanical fastener 504 includes a bolt 506 having a threaded portion 508 and a head 510. The head 510 is frusto-conical (i.e., tapered) in shape to compliment the shape of the interior surface 404 and defines a receiving portion 512 to receive the end 502 of the heating element 106. Once connected, the mechanical fastener 504 provides an electrical interconnection between the battery and the heating element 106.

The bolt 506 is configured to be received through a corresponding tapered cylindrical aperture 514 defined by the frame 102. The tapered cylindrical hard coated bushing 402 is received within the corresponding tapered cylindrical aperture 514, and the tapered cylindrical hard coated bushing 402 receives the tapered head 510 of the bolt 506. A corresponding nut 516 is used to secure the bolt 506 in position, which also secures the bolt 506 with respect to the heating element 106 received in the receiving portion 512 of the head 510. Once the bolt 506 is secured, the tapered cylindrical hard coated bushing 402 and the bolt 506 form a seal with respect to the corresponding tapered cylindrical aperture 514. In various implementations, the second end 410 of the tapered cylindrical hard coated bushing 402 functions as a collar to support the bolt 506.

Figure 6A:
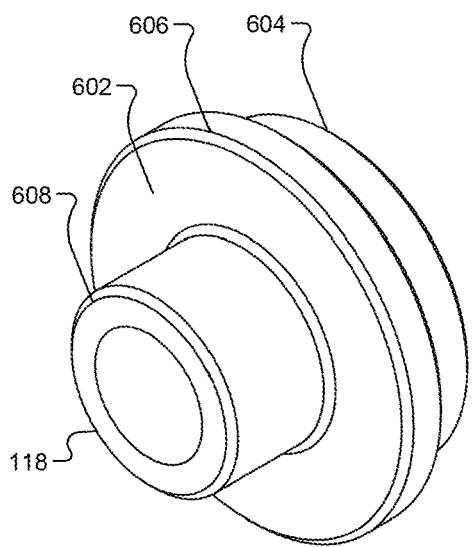
FIG. 6A is an isometric view of a hard coated bushing employed by the intake air heating system according to the principles of the present disclosure.
Figure 6B:
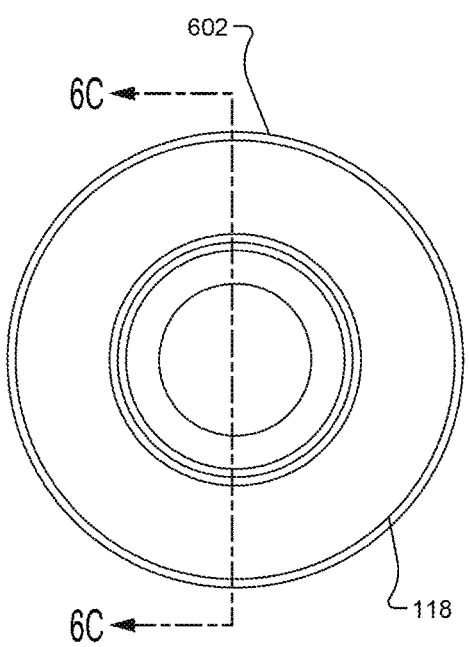
FIG. 6B is a plan view of the hard coated bushing shown in FIG. 6A according to the principles of the present disclosure.
Figure 6C:
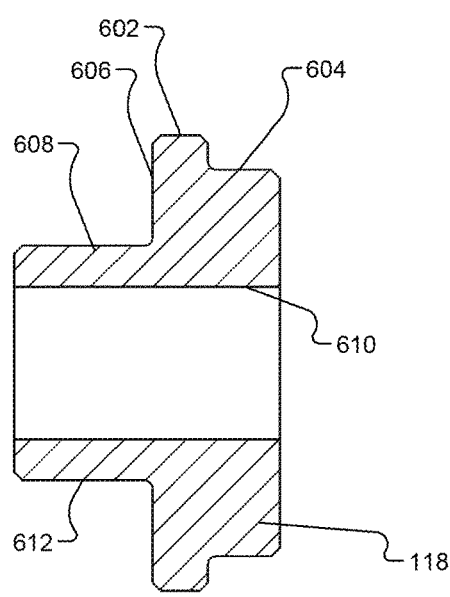
FIG. 6C is a cross-sectional view of the hard coated bushing shown in FIG. 6B according to the principles of the present disclosure.

FIGS. 6A through 6C illustrate another implementation of the hard coated bushings 118 in accordance with the present disclosure. In this implementation, the hard coated bushings 118 include a hard coated bushing 602. The hard coated bushing 602 includes a generally cylindrical base portion 604, a flanged portion 606, and a generally elongated cylindrical portion 608. The flanged portion 606 is configured to interface with a surface of the frame 102 to provide additional sealing functionality. This bushing 602 includes an interior surface 610 and an exterior surface 612. The interior surface 610 and the exterior surface 612 include the aluminum oxide layer to mitigate current shorts between the terminals 110, 112 and the frame 102.

FIGS. 7A through 7D illustrate another implementation of the hard coated bushings 118 in accordance with the present disclosure. As shown in FIGS. 7A and 7B, a mechanical fastener 702, such as a bolt 704 that includes a head 706 and a threaded fastener portion 708, is connected to the heating element 106. In this implementation, the air intake assembly 100 employs a first hard coated bushing 710 and a second hard coated bushing 712. The second hard coated bushing 712 defines a volume to receive the first hard coated bushing 710, and the first hard coated bushing 710 defines a volume to receive the bolt 704. For example, the first hard coated bushing 710 includes an annular ring portion 714 and an elongated barrel portion 716. The second hard coated bushing 712 includes an annular ring portion 718 and an elongated barrel portion 720.

The annular ring portions 714, 718 define respective apertures for receiving various components as described herein. Additionally, the elongated barrel portions 716, 720 define volumes to receive the components as described herein. For example, the aperture of the annular ring portion 718 is larger than the aperture of the annular ring portion 714 to allow the second hard coated bushing 712 to receive the barrel portion 716 of the first hard coated bushing 710. For instance, the barrel portion 720 includes a diameter that is greater than the diameter of the barrel portion 716. Thus, when the bolt 704 fastens the heating element 106 with respect to the frame 102 as shown in FIGS. 7C and 7D, the barrel portion 720 receives the barrel portion 716. The elongated barrel portion 720 is received in a corresponding aperture defined within the frame 102. Additionally, the barrel portion 716 receives the threaded fastener portion 708. The elongated barrel portions 716, 720 insulate the bolt 704 from the frame 102. The annular ring portions 714, 718 may include the same diameter. Additionally, the annular ring portions 714, 718 are directly adjacent and in contact with one another when the bolt 704 is fastened to the frame 102. The annular ring portions 714, 718 can also interface with a surface of the frame 102 as shown in FIGS. 7C and 7D.

In these implementations, since the second hard coated bushing 712 receives the first hard coated bushing 710, the exterior and the interior surfaces of the first and the second hard coated bushings 710, 712 would need exposed aluminum to create a current short between the heating element 106 and the frame 102.

This implementation may also reduce wear because the surfaces (i.e., exterior and interior) of the first hard coated bushing 710 do not directly interface with the frame 102, and the first and the second hard coated bushings 710, 712 do not move relative to one another when vibrated. Additionally, the first and the second hard coated bushings 710, 712 can serve as a heat sink to reduce heat provided to a seal 722. The seal 722 may comprise a silicone seal that serves as an additional air seal to prevent unwanted air from entering or exiting the intake air assembly 100 when the bolt 704 is fastened with respect to the frame 102 with a nut 724.

In some implementations, an insulated washer 726 is employed under the nut 724 to mitigate current shorts between the bolt 704 and the frame 102. The insulated washer 726 may be manufactured from mica, phenolic, high temperature resin, and the like.

FIGS. 8A through 8D illustrate another example implementation of the air heater assembly 100 that employs hard coated bushings 802, 806. In this implementation, the hard coated bushings 118 include a first hard coated bushing 802 that includes an elongated barrel portion 804 and a second hard coated bushing 806 that includes an elongated barrel portion 808. Similar to the implementation described in FIGS. 7A through 7D, the elongated threaded fastener portion 708 is received by the elongated barrel portion 804, and the elongated barrel portion 804 is received by the elongated barrel portion 808. The elongated barrel portion 808 is received by a corresponding aperture defined within the frame 102.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An air heater assembly, comprising:
   a frame defining an aperture;
   at least one air heater including at least one heating element, wherein the frame is configured to receive the at least one air heater;
   a terminal configured to connect with the at least one heating element; and
   a hard coated bushing configured to receive the terminal, wherein the hard coated bushing includes aluminum electrochemically processed to form an external layer of aluminum oxide, the hard coating bushing including an elongated hollow portion and a radially extending flanged portion, the elongated portion being configured to be received within the aperture and the flanged portion abutting the frame to form a seal and to electrically isolate the terminal from the frame.

2. The air heater assembly of claim 1, wherein the elongated hollow portion includes an interior surface and an exterior surface, the interior surface and the exterior surface including the aluminum oxide layer to mitigate current shorts between the terminal and the frame.

3. The air heater assembly of claim 2, wherein a thickness of the aluminum oxide layer ranges from 0.0005" to 0.002".

4. The air heater assembly of claim 1, wherein the hard coated bushing includes a rectangular hard coated bushing having rounded edges.

5. The air heater assembly of claim 1, wherein the hard coated bushing comprises a Type III hard coat anodized bushing.

6. The air heater assembly of claim 1, further comprising another hard coated bushing including an elongated barrel portion, the elongated barrel portion of the another hard coated bushing configured to receive the hard coated bushing, and the elongated portion of the hard coated bushing configured to receive the terminal.

7. The air heater assembly of claim 6, wherein the elongated barrel portion of the another hard coated bushing is connected to an annular ring portion, and the flange of the hard coated bushing engages the annular ring portion.

8. An air heater assembly, comprising:
   a frame defining an aperture;
   at least one air heater including at least one heating element, wherein the frame is configured to receive the at least one air heater;
   a tapered terminal configured to connect with the at least one heating element; and
   a hard coated hollow bushing including a tapered inner surface and a tapered outer surface, the tapered terminal engaging the tapered inner surface, wherein the hard coated bushing comprises aluminum electrochemically processed to form an external aluminum oxide layer and the hard coated bushing is configured to be received within the aperture and the outer tapered surface engages the frame to form a seal and to electrically isolate the terminal from the frame.

9. The air heater assembly of claim 8, wherein a thickness of the aluminum oxide layer ranges from 0.0005" to 0.002".

10. The air heater assembly of claim 8, wherein the hard coated bushing comprises a Type III hard coat anodized bushing.

11. The air heater assembly of claim 8, wherein the terminal comprises a threaded fastener including a head, the head including the tapered terminal.

12. An air heater assembly, comprising:
    a frame defining an aperture;
    at least one air heater including at least one heating element, wherein the frame is configured to receive the at least one air heater;
    a terminal configured to connect with the at least one heating element;
    a first hard coated bushing comprising an elongated barrel portion configured to receive the terminal; and
    a second hard coated bushing comprising an elongated barrel portion configured to receive the first hard coated bushing,
    wherein the first hard coated bushing and the second hard coated bushing each comprise aluminum electrochemically processed to form an external aluminum oxide layer and are configured to be received within the aperture to form a seal and to electrically isolate the terminal from the frame.

* * * * *